Oct. 21, 1941.  C. F. JOHNSTON  2,260,031
PISTON RING
Filed Sept. 16, 1938  2 Sheets-Sheet 1
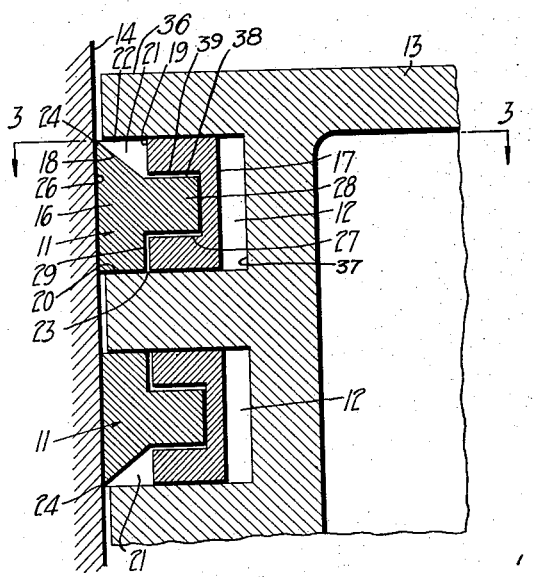
INVENTOR.
Charles F. Johnston
BY Joseph B. Gardney
ATTORNEY Oct. 21, 1941.   C. F. JOHNSTON   2,260,031
PISTON RING
Filed Sept. 16, 1938   2 Sheets-Sheet 2
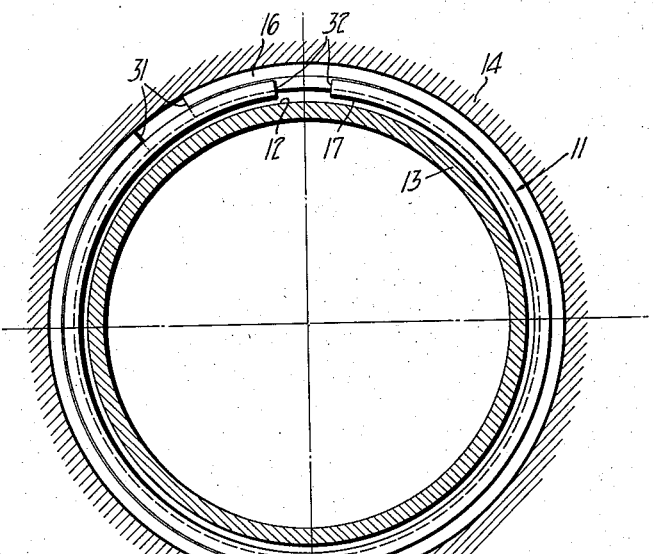
FIG_3_
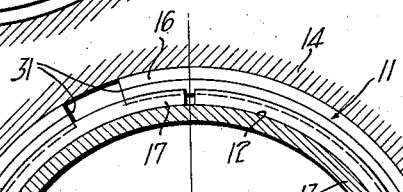
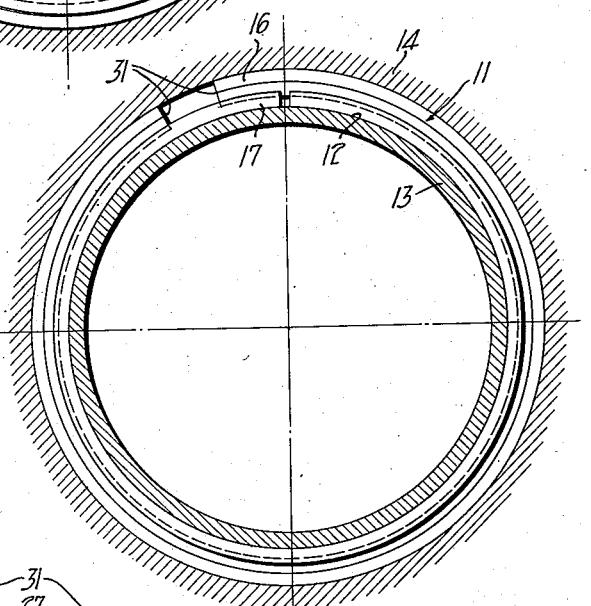
FIG_4_
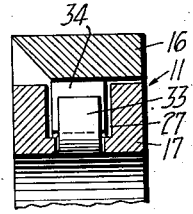
FIG_6_
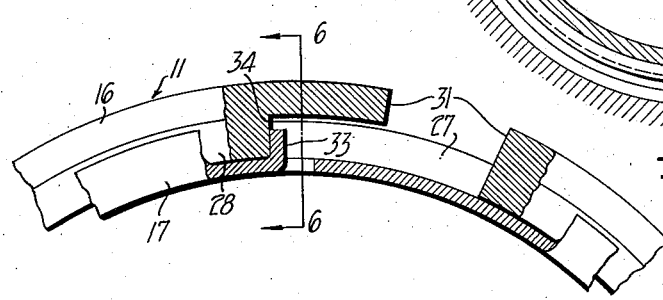
FIG_5_
INVENTOR.
Charles F. Johnston
BY Joseph B. Gardner
ATTORNEY.

Patented Oct. 21, 1941

2,260,031

UNITED STATES PATENT OFFICE 2,260,031

PISTON RING

Charles F. Johnston, Oakland, Calif.

Application September 16, 1938, Serial No. 230,167

9 Claims. (Cl. 309—31)

The invention relates to piston rings such as for example, used in reciprocating pistons of an internal combustion engine or the like.

An object of the present invention is to provide a piston ring adapted for use in a piston ring groove to seal a piston in a cylinder to prevent passage by the piston of fluid compressed in the cylinder by the piston, and which is so designed and constructed as to utilize the fluid pressure in the cylinder to expand the piston ring into sealing engagement with the cylinder, whereby the cylinder wall pressure of the ring is proportional to the pressure of the operating fluid and is automatically responsive to such pressure for increasing or decreasing such wall pressure to the end that an improved seal is provided between the piston and the cylinder with only sufficient wall pressure and attendant frictional resistance as is necessary to effect such seal. In accordance with this feature of the invention, the piston ring will run very free in the cylinder during the suction and exhaust strokes of the engine, with only a nominal wall pressure, but ample to seal the piston in the cylinder for the fluid pressures then existing in the cylinder, and during the compression and power strokes the ring will be expanded with greater force against the cylinder wall to maintain an equally good seal during these strokes. Even during the compression and power strokes the ring expansion force is proportional to the pressure existing in the cylinder and, therefore, automatically provides a seal during the full length of these strokes with a constantly changing minimum wall pressure. Thus a greatest wall pressure is obtained following the point of ignition at the start of the power stroke and the ring expansion force decreases during the power stroke in accordance with the decreasing pressure in the cylinder. As a result of this construction, I am able to provide an extremely efficient piston ring which first gives to the engine a much freer and much greater responsiveness and efficiency than pistons heretofore; and secondly, to provide a ring which is subject to a very substantially decreased amount of wear due to the lower wall pressures during portions of the operating cycle than is possible to obtain with expander type rings providing a constant large wall pressure heretofore obtainable. The present ring while greatly bettering the performance of an internal combustion engine, has the further advantage of having a life greater than double that obtained with other types of rings, wherein good wall pressures are obtained during the compression and expansion strokes.

Another object of the invention is to provide a piston ring of the character described which may be used as either a compression type or oil control or scraper type ring and will in either instance be responsive to the pressure of the products of combustion on the one hand, or the accumulated oil on the other, to increase the wall pressure of the ring when most needed.

A further object of the invention is to provide a piston ring of the character above which will operate for a substantially indefinitely long period in an internal combustion engine without becoming clogged with carbon, oil sludge or the like, and will by reason of the continuous flexing and expansion and contraction of the various parts thereof, actively attack and dislodge and free itself from any of such material deposited thereon.

Still another object of the invention is to provide a piston ring of the character described which, although constructed in the preferred form of the invention of two separate pieces, will nevertheless be so designed and arranged as to afford the simplicity of handling and installation of a one-piece ring.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is an enlarged fragmentary longitudinal cross-sectional view of a piston and cylinder showing a pair of rings constructed in accordance with the present invention mounted in a pair of ring grooves in said piston. The position of the rings in the grooves is substantially that of normal position, that is when not under high fluid pressure.

Figure 2 is a cross-sectional view similar to Figure 1, but showing the approximate arrangement of the rings when under an operating fluid pressure.

Figure 3 is a plan sectional view of one of the rings and the piston and cylinder assembly shown in Figure 1, and is taken substantially on the plane of line 3—3 of Figure 1.

Figure 4 is a plan sectional view similar to

Figure 3 and is taken on the plane of line 4—4 of Figure 2, to show one of the rings in expanded position.

Figure 5 is a fragmentary plan sectional view of one of the rings and showing an anchorage means for relatively moving parts of the ring.

Figure 6 is a transverse cross-sectional view of a part of the anchorage means illustrated in Figure 5, and is taken substantially on the plane of line 6—6 of Figure 5.

Figure 7 is a cross-sectional view similar to Figure 1, but showing a modified form of the piston ring.

Figure 8 is a cross-sectional view similar to Figure 7, but showing a further modified form of the piston ring.

The piston ring 11 of the present invention and as depicted in the accompanying drawing, consists of a ring shaped body adapted for mounting within a piston ring groove 12 of a piston 13, such as used in an internal combustion engine, for sealing the piston within an operating cylinder 14. The ring 11 comprises a pair of inner and outer split ring members 16 and 17 which are adapted for mounting in the groove 12 in substantially coplanar relation and arranged for expansion and contraction relative to each other. As an important feature of the present ring I form the members 16 and 17 with radially opposed walls 18 and 19 to define therebetween a chamber 21 which opens to a radial side 22 of the ring for receipt of fluid under pressure, which urges the expansion of the chamber and a corresponding expansion of the outer member 16 and a contraction of the inner member 17. Preferably, the surface 18 is beveled or inclined to the radial and longitudinal lines of the ring so as to increase the size of the chamber 21 and also to establish downward and outward component forces acting on the outer ring member when the chamber is under pressure to positively seat the outer periphery 26 of the ring member 16 against the cylinder wall 14, and the bottom surface 20 of the ring against the bottom ring land surface 23 of the groove. Preferably also, the bevel of the surface 18 is continued to an end 24 of the outer peripheral surface 26 of the ring member 16, so as to provide at the end 24 a sharply defined ring scraper edge, which is conducive for cooperation with the beveled surface 18 to the influx of fluid or oil into the chamber 21 from the cylinder wall.

Desirably, a means is provided for holding the rings against longitudinal separation and which cooperates with the resilience of the ring members to normally hold the same in assembled position so that the ring may be handled and installed substantially as readily as a common one-piece ring. In the form of the ring illustrated in Figures 1 to 6, the inner ring member 17 is provided with a circumferentially extending groove or channel 27 in the outer peripheral face 19 thereof, which is adapted to receive a circumferentially extending tongue 28 projecting inwardly from the inner peripheral face 29 of the outer ring member. Preferably, the tongue 28 is provided with a relatively loose fit within the channel 27 so that some relative longitudinal movement between the ring members may be provided.

Means is also preferably provided for anchoring the ring members against relative circumferential displacement, so as to maintain the free ends 31 of the outer ring member spaced circumferentially from the free ends 32 of the inner ring member and at the same time to keep the free ends of the inner ring member adjacent to the ends 31, so as to afford a maximum expansion action on the free ends of the outer ring. As here shown in Figures 5 and 6, this means is effectively provided in the form of a tongue or projection 33 struck out from the body of the inner ring member 17 into the channel 27, so as to engage an end face 34 of the tongue 28, which is preferably spaced from the adjacent end 31 of the outer ring member. This spacing of the tongue end 34 from the ring end 31 affords ample relative movement of the outer ring member between the end 31 and the tongue end 34 relative to the projection 33 so that the opposite ends 31 of the outer ring member may be completely closed without hindrance or obstruction from the projection 33.

The operation of the piston ring when used as a compression ring, such as illustrated in the upper ring in Figures 1 and 2, is as follows: During the compression and power strokes operating fluid compressed in the cylinder passes by the top peripheral head surface 36 of the piston to strike the beveled edge 18 of the outer ring member, and to thereby enter and expand the chamber 21. The action of the fluid pressure, as may be seen in the drawings by comparing Figures 1 and 2, is to force the ring 16 outwardly against the cylinder wall 14 and downwardly against the bottom ring land 23. Conversely, the fluid pressure acting upon the outer peripheral surface 19 of the inner ring presses the same to a contracted position at the base 37 of the ring groove. In addition, the compressed fluid forces its entrance into space 38 between the top surface 39 of the channel 27 and the top surface 41 of the tongue 28 to cause a vertical separation of the outer and inner ring members. Since as aforesaid, the outer ring member is pressed downwardly to the outer ring land 23, the action of the fluid pressure in the space 38 is to elevate the inner ring member, as illustrated in Figure 2, so as to engage the bottom tongue surface 42 with the bottom channel surface 43, to thereby seal the compressed fluid within a chamber 44 defined between the inner surface 46 of the tongue and the base surface 47 of the channel. The compressed fluid in the chamber 44 further acts to cause an expansion of the outer ring member 16 and a contraction of the inner ring member 17. If the vertical clearances between the tongue and channel are properly selected in relation to the longitudinal dimension of the ring and ring groove, the top surface 48 of the inner ring member 17 will be pressed upwardly against the top ring land surface 49 to thereby shut off any flow of compressed fluid around to the back of the ring. However, even where this dimensional relationship is not observed, the normally greater size of the chamber 38 than the clearance at the top of the inner member and the naturally induced flow of compressed fluid into such chamber, will cause an elevation of the inner ring member and a sealing of the ring in the ring groove as above described. Thus the operating fluid is entrapped in the chambers 21, 38 and 44 and is prevented escape by the piston ring due to the firmly sealed engagement of the outer peripheral surface 26 of the ring against the cylinder wall, and the sealed engagement of the tongue and channel surfaces 42 and 43, and a further sealed engagement of the ring bottom surface with the bottom ring land surface 23.

It will thus be seen that the sealing force of the outer ring member against the cylinder wall is a function of the pressure existing in the cylinder and consequently, at high fluid pressures when greater sealing force is required, greater sealing force is automatically supplied, and conversely, at lower fluid pressures when only nominal sealing force is required, only nominal sealing force is provided. In this manner the piston ring will allow the piston to reciprocate very freely during the suction and exhaust strokes of the engine, and will tighten up during the compression and power strokes, but only sufficiently so as to effectively seal the piston in the cylinder. A greatest wall pressure will be produced immediately following the ignition point at the beginning of the power stroke and this wall pressure will taper off towards the end of the stroke. Conversely, the wall pressure steadily increases from the beginning of the compression stroke to the end of such stroke.

While the expansion force on the outer ring member varies considerably during the cycle of the engine, the actual physical displacement of the outer ring member is comparatively slight. This is due to the fact that at low fluid pressures the outer ring member is normally urged to the cylinder side wall by the normal expanding force imparted to it by the inner ring member and by its own resilience. As the expansion force increases due to the entrance of compressed fluid into chamber 21, the outer member, while pressed with greater force against the cylinder wall, cannot move appreciably. On the other hand, the inner ring member is subjected to a much larger relative expansion and contraction displacement. At normal fluid pressures the inner ring member moves outwardly under its own resilience to a position spaced from the base of the ring groove, as illustrated in Figure 1, and is contracted to the base of the ring groove when acted upon by large fluid pressures. Due to this difference in relative displacement of the inner and outer ring members, I prefer to form these members of different materials, each best fitted for its particular function. Due to the relatively small movement of the outer ring member and its required function of providing a bearing for the piston against the cylinder, I prefer to make this outer ring member of cast iron. On the other hand, in the case of the inner ring member, due to the relatively large and rapid expansion and contraction to which it is subjected, and due to the fact that this ring is not called upon for a bearing surface against the cylinder wall, I prefer to form the same of a material having greater elasticity than cast iron, and have found that the best material is steel or appropriate steel alloys. The continual action of the inner ring against the piston at the bottom of the ring groove tends to hammer or peen the inner peripheral surface of the ring, which acts to increase the tension of the inner ring with continued use of the ring. The action of such peening tends to expand or open out the inner ring due to the compacting and crowding of material at the inner peripheral portion thereof, so as to compensate for the normal loss in resilience due to wear and even increase this resilience during the life of the ring.

It will also be noted that due to the circumferential extent of the expansion chamber of the ring and the hydraulic equalizing action of the fluid under pressure in the chamber, the expansion force on the ring will be absolutely uniform at each circumferential portion of the ring.

Another important advantage of the ring construction illustrated in Figure 1 is that the same may be inverted, as illustrated in the lower ring of Figures 1 and 2, to provide an improved oil control or scraper ring. In such case the oil removed from the cylinder side wall by the scraper edge 24 now at the bottom of the ring, enters the chamber 21 to produce an expansion of the outer ring member and a contraction of the inner ring member and an entrapment of the oil identical to the operation of the ring under fluid pressure above described. In such case, the presence of the entrapped oil in the chamber 21 and below the scraper edge 24, provides a highly desirable gas impervious oil seal for the piston.

In the form of the invention illustrated in Figure 7, the outer ring member 16' is provided with beveled chamber defining surfaces at both the top and bottom sides 18' and 29' of the ring, so as to define fluid pressure chambers 21' and 21'' at both the top and bottom sides of the ring. This ring construction combines the advantages of the ring illustrated in Figure 1 when used in both upright and inverted position, as above described. The compressed fluid entering the chamber 21' acts to expand the outer ring member and contract the inner ring member as does likewise the oil forced into the lower chamber 21''. The ring is thus simultaneously responsive to both the pressure of the compressed gas and the pressure of the oil scraped from the cylinder wall.

In the form of the invention illustrated in Figure 8, a modified attaching means is used for the inner and outer ring members to prevent their relative longitudinal separation. In this form of the invention the inner and outer ring members 17'' and 16'' are provided with registering circumferentially and radially extending channels 51 and 52 opening to the outer and inner peripheral faces of the members respectively for the receipt of a third ring member 53 in the form of a flat annulus, which engages in the channels 51 and 52 to prevent longitudinal separation of the inner and outer ring members.

An important advantage of the present ring in all of the above embodiments lies in the fact that the ring will accumulate practically no carbon and oil sludge which may clog and otherwise hamper the efficient operation of the ring. This feature of the ring results from the constant and rapid change in relative position of the ring parts, so that no opportunity is given the carbon or sludge to deposit and build up at any point on the ring. Thus the ring will remain free from carbon and sludge deposits for substantially its full life.

While in describing the present piston ring in the above, mention has been made as to its use in an internal combustion engine, it will be understood that the ring has a wider application for use with any piston for sealing the latter in a cylinder to prevent passage of fluid thereby, and may be used in all types of motive equipment, such as pumps, compressors, and the like.

I claim:

1. A packing ring adapted for use in a piston ring groove to seal the piston in a cylinder for compression of an operating fluid comprising, a pair of split ring members of resilient material adapted to fit one within the other in substantially coplanar relation, means securing said members for limited relative axial movement and affording relative radial expansion and contraction of said members, said members having radially opposed circumferentially extending walls connected to axially opposed radially extending walls defining an open top annular chamber adapted to receive fluid under pressure from said cylinder whereby said fluid will operate against said radially opposed walls to urge the expansion of said outer member and the contraction of said inner member and will operate against said axially opposed walls to displace said members in opposite directions axially to seal the opposite groove ring lands.

2. A piston compression ring adapted for mounting in the uppermost ring groove of a piston for sealing said piston in a cylinder for preventing compressed fluid escaping thereby comprising, a pair of split ring members adapted for mounting one within the other in substantially coplanar relation, the outer of said members being provided with a beveled top radial surface extending to the peripheral edge of said outer member, the inner member having an outer face spaced inwardly from said surface to define an open top chamber therebetween, means for holding said ring members for limited axial displacement including axially spaced radially extending walls on said members defining a space therebetween forming a continuation of said chamber, said outer ring member normally extending beyond the periphery of the piston to engage said cylinder to thereby communicate said chamber to said cylinder for receipt of compressed fluid into said chamber whereby said fluid will operate against said beveled surface and said face to expand said outer ring member against said cylinder and contract said inner ring member against the base of said groove and will operate against said axially spaced walls to move said ring members in opposite axial directions against the groove ring lands.

3. A piston ring adapted for mounting in a piston ring groove to seal the piston in a cylinder to prevent passage of fluid thereby comprising, a pair of split ring members adapted to fit one within the other in substantially coplanar relation and mounted for relative radial expansion and contraction of said members, the outer of said members having the opposite radial sides thereof beveled to the outer peripheral edge of said outer member and arranged in opposed position to the outer peripherial surface of said inner member to define therebetween chambers at the top and bottom radial surfaces of the ring for receipt of fluid under pressure to urge the expansion of said outer member and the contraction of said inner member, said inner member being formed with a circumferentially extending slot in the outer surface thereof, said outer member being formed with a circumferentially extending tongue extending inwardly from between said beveled sides and loosely fitting in said slot with clearance between the top and bottom sides of said tongue and the opposed top and bottom sides of said slot whereby fluid pressure in either of said chambers will cause relative axial movement of said members.

4. A piston ring adapted for mounting in a ring groove of a piston to seal the latter in a cylinder of an internal combustion engine or the like and comprising, a pair of split ring members adapted for mounting one within the other in substantially coplanar relation and having loosely interfitting substantially centrally positioned tongue and groove portions permitting limited relative axial displacement of said members, the outer of said members having the opposite radial surfaces thereof beveled to substantially the outer peripheral edge of the member to define sharp peripheral top and bottom edges for the ring, said beveled surfaces being mounted in opposed relation to outer peripheral surfaces of said inner member and at the opposite sides of said tongue and groove portions so as to define therebetween a bevel shaped chamber at the top of the ring and a bevel shaped chamber at the bottom of the ring for receipt of compressed operating fluid and oil respectively for urging the expansion of said outer member and contraction of said inner member and a relative axial displacement of said members.

5. A piston ring adapted for mounting in a piston ring groove to seal the piston in a cylinder to prevent passage of fluid thereby comprising, an inner ring member formed with a circumferential slot in the outer surface thereof, an outer ring member formed with a beveled radial surface extending to its outer peripheral edge to define a sharp ring edge surface for engagement with said cylinder, a circumferential projection on said outer ring member loosely mounted in said circumferential slot in said inner ring member to permit relative radial and axial movements of said ring members, and a circumferential surface on said inner ring member opposed to said beveled surface of said outer ring member, said surfaces forming a bevel sided chamber open to a radial side of said ring at the outer peripheral edge thereof and communicated with a second chamber formed by the clearance between said circumferential projection on said outer ring member and the walls of said circumferential slot in said inner ring member, said chambers being adapted for receipt of fluid under pressure to cause an expansion and contraction of said outer and inner ring members respectively to seal said outer ring member to said cylinder wall and said inner ring member to said piston ring groove and a relative axial displacement of said ring members to seal said ring members together.

6. A multi-piece piston ring comprising, inner and outer ring sections having loosely fitting annular tongue and groove portions with clearance between the opposed sets of radial walls of said portions to permit limited relative axial movement of said sections, the diametrical size and form of said sections normally providing a space between said sections, said space being communicated with said one set of opposed radial walls of said tongue and groove portions whereby the entry of compressed fluid into said space will cause the expansion of said outer section and the contraction of said inner section and the expansion of the clearance between said last named set of opposed radial walls and a relative axial displacement of said sections to seal the opposite set of opposed radial walls of said tongue and groove portions.

7. A multi-piece piston ring adapted for mounting in the ring groove of a piston and comprising, inner and outer ring sections having loosely fitting annular tongue and groove portions with sufficient clearance between the opposed radial walls of said portions to permit relative axial movement of said sections to engage the opposite ring lands of the piston ring groove, said outer section having a beveled radial surface positioned in spaced relation to an outer circumferential surface on said inner section to define a chamber open to an end of the ring, said chamber being communicated to said clearance between said opposed radial walls of said tongue and groove portions whereby the entry of fluid under pressure into said chamber will cause the expansion of said outer section and the contraction of said inner section and a relative axial displacement of said sections.

8. A multi-piece piston ring comprising, inner and outer ring sections, said inner ring being formed with an annular groove in the outer periphery thereof, said outer section being formed with an annular tongue projecting inwardly from the inner periphery thereof intermediate the axially spaced ends of the section, the axial dimensions of said sections being substantially the same and the ends of said sections being substantially aligned in an aligned position of said tongue and groove, the axial dimension of said tongue being less than the axial dimension of said groove whereby said sections may be relatively displaced in an axial direction to axially offset the adjacent ends of the sections, one of said ends of said outer section being beveled to define a chamber between said end and the opposed outer periphery of said inner section and said groove.

9. A multi-piece piston ring comprising, inner and outer ring sections of substantially equal axial dimensions, interfitting tongue and groove portions formed on and in the adjacent opposed peripheries of said sections substantially centrally of the axial dimension thereof whereby the adjacent ends of the sections will be substantially aligned in the aligned position of said tongue and groove portions, the axial dimension of said tongue portion being less than the axial dimension of said groove portion so as to permit relative axial displacement of said sections into an axially offset position of said ends wherein one end of said outer section may engage one of the piston ring-groove lands and the opposite end of the inner section may engage the opposite piston ring-groove land, the other end of said outer section being beveled and spaced from the adjacent outer periphery of said inner section to define an open ended chamber therewith communicated with said groove portion whereby the entry of fluid under pressure into said chamber will produce an expansion of said outer section and an axial offsetting of said sections.

CHARLES F. JOHNSTON.